US011660692B2

(12) United States Patent
Takemoto et al.

(10) Patent No.: US 11,660,692 B2
(45) Date of Patent: May 30, 2023

(54) THERMAL DISPLACEMENT COMPENSATOR

(71) Applicant: FANUC CORPORATION, Yamanashi (JP)

(72) Inventors: Masanobu Takemoto, Yamanashi (JP); Keita Hada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 170 days.

(21) Appl. No.: 17/120,261

(22) Filed: Dec. 14, 2020

(65) Prior Publication Data

US 2021/0197303 A1 Jul. 1, 2021

(30) Foreign Application Priority Data

Dec. 26, 2019 (JP) .............................. JP2019-237228

(51) Int. Cl.
  *G05B 13/02* (2006.01)
  *B23H 7/20* (2006.01)
  *G05B 19/404* (2006.01)

(52) U.S. Cl.
  CPC ........... *B23H 7/20* (2013.01); *G05B 13/0265* (2013.01); *G05B 19/404* (2013.01); *G05B 2219/45043* (2013.01); *G05B 2219/49206* (2013.01); *G05B 2219/49307* (2013.01)

(58) Field of Classification Search
  None
  See application file for complete search history.

(56) References Cited

U.S. PATENT DOCUMENTS

| | | | | |
|---|---|---|---|---|
| 9,849,529 | B2 * | 12/2017 | Yoshizaki | ................ B23H 7/02 |
| 10,353,373 | B2 * | 7/2019 | Suzuki | ................ G05B 19/404 |
| 11,305,395 | B2 * | 4/2022 | Hada | ................ B23Q 11/0007 |
| 2006/0089745 | A1 * | 4/2006 | Suzuki | ................ G05B 19/404 |
| | | | | 700/174 |
| 2013/0190921 | A1 * | 7/2013 | Maekawa | .......... B23Q 11/0007 |
| | | | | 700/177 |
| 2013/0223946 | A1 * | 8/2013 | Yamamoto | ........... G05B 19/404 |
| | | | | 409/80 |
| 2014/0197138 | A1 * | 7/2014 | Yoshizaki | .............. B23H 7/065 |
| | | | | 219/69.12 |
| 2015/0106048 | A1 * | 4/2015 | Xie | ........................ G01K 13/00 |
| | | | | 702/136 |
| 2016/0167147 | A1 * | 6/2016 | Yoshizaki | .......... B23Q 11/0042 |
| | | | | 219/69.11 |

(Continued)

FOREIGN PATENT DOCUMENTS

JP 201869408 A 5/2018
JP 2020099982 A * 7/2020

*Primary Examiner* — Jason Lin
(74) *Attorney, Agent, or Firm* — Hauptman Ham, LLP (57) ABSTRACT

A thermal displacement compensator measures a temperature of an environment in which a machine is installed and a temperature of each part of the machine, and calculates a temperature difference between at least two temperatures among measured temperatures. Furthermore, the thermal displacement amount of the machine is acquired. Then, based on teacher data using the measured temperatures and the calculated temperature difference as input data and using the acquired thermal displacement amount as output data, a thermal displacement compensation model that estimates the output data from the input data is created by machine learning.

4 Claims, 6 Drawing Sheets

(56) References Cited

U.S. PATENT DOCUMENTS

2018/0122623 A1  5/2018  Hada
2018/0196405 A1* 7/2018  Maekawa ............ G05B 19/404
2019/0099849 A1* 4/2019  Hada ...................... B23Q 15/18

* cited by examiner

THERMAL DISPLACEMENT COMPENSATOR

RELATED APPLICATIONS

The present application claims priority to Japanese Patent Application Number 2019-237228 filed Dec. 26, 2019, the disclosure of which is hereby incorporated by reference herein in its entirety.

BACKGROUND OF THE INVENTION

1. Field of the Invention

The present invention relates to a thermal displacement compensator, and particularly to a thermal displacement compensator in an electric discharge machine.

2. Description of the Related Art

Figure 4:
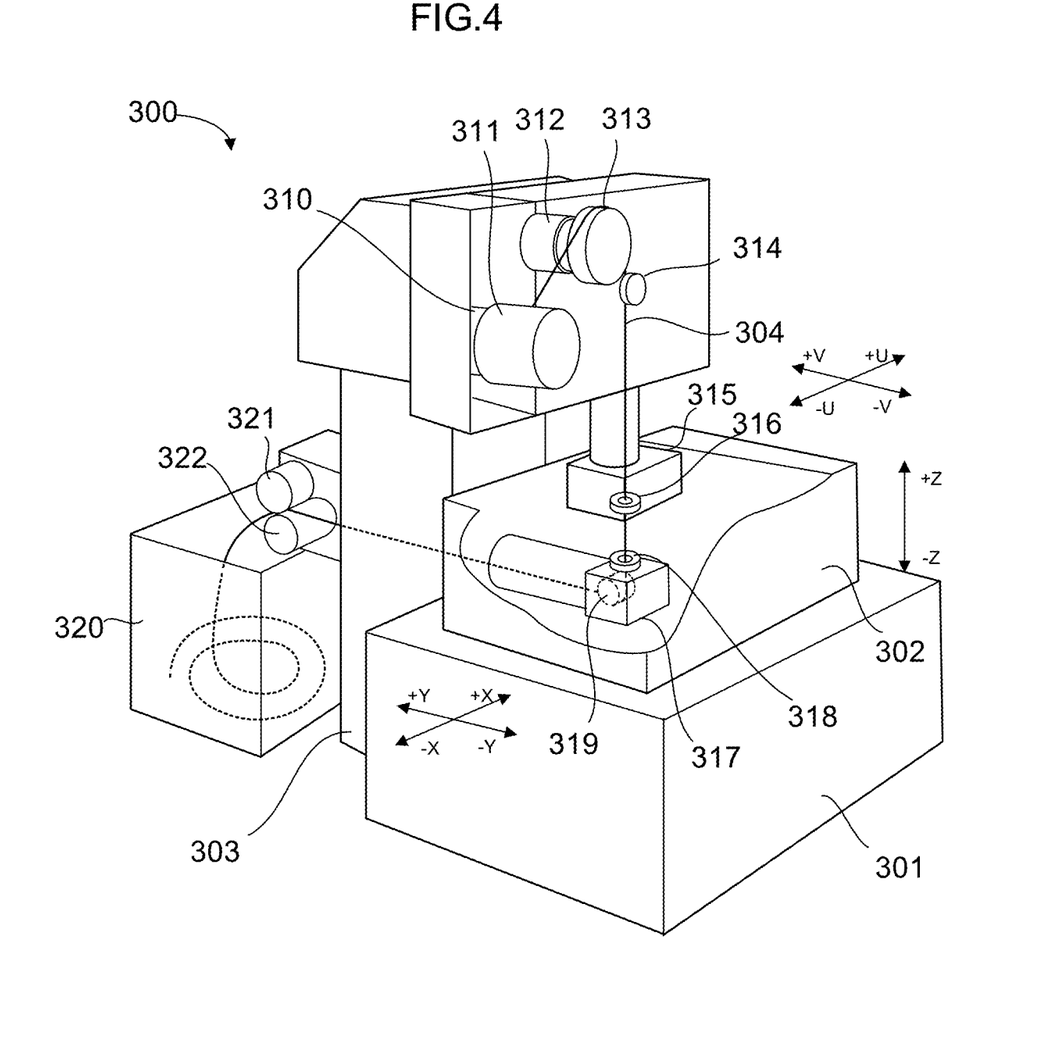
FIG. 4 is a schematic configuration diagram of a wire electric discharge machine.

FIG. 4 is a schematic configuration diagram of a wire electric discharge machine, which is a type of electric discharge machine.

A wire electric discharge machine 300 machines a workpiece (not illustrated) placed in a machining tank 302 on a machine base 301 by a wire electrode 304. A wire bobbin 311 around which the wire electrode 304 is wound is attached to an upper part of a column 303 erected at a back end of the machine base 301. The wire bobbin 311 is subjected to a predetermined low torque commanded in a direction opposite to a pull-out direction of the wire electrode 304 by a feeding portion torque motor 310. The wire electrode 304 unwound from the wire bobbin 311 is hung around a feed roller 322 via a brake shoe 313 driven by a brake motor 312, an upper guide roller 314, an upper wire support guide 316 provided on an upper guide 315, a lower wire support guide 318 provided on a lower guide 317, and a lower guide roller 319. The tension of the wire electrode 304 between the brake shoe 313 driven by the brake motor 312 and the feed roller 322 driven by a wire electrode feed motor (not illustrated) is adjusted. The wire electrode 304 is interposed between a pinch roller 321 and the feed roller 322 driven by the wire electrode feed motor (not illustrated), and is collected in a wire electrode collection box 320. A table on which the workpiece is placed is installed in the machining tank 302 on the machine base 301. In an electric discharge machining region between the upper guide 315 and the lower guide 317, the workpiece (not illustrated) as a machining object is placed on the table (not illustrated), a high frequency voltage is applied to the wire electrode 304 from a machining power supply, and electric discharge machining is performed.

As described above, the electric discharge machine is configured by a combination of various mechanical elements. These mechanical elements have different coefficients of thermal expansion. For this reason, when the temperatures of the mechanical elements rise to cause thermal strain due to a change in the ambient temperature, heat generated by an electric discharge power supply (not illustrated), heat by arc discharge during electric discharge machining, heat of a pump (not illustrated) for circulating a machining fluid, etc., shifts of relative positions and postures of the mechanical elements occur. These shifts affect a positional relationship between the electrode and the workpiece, and cause a decrease in machining accuracy.

In order to prevent the decrease in machining accuracy, the temperature of each part of the electric discharge machine is measured, and the thermal displacement amount is compensated based on the measured temperature. In the wire electric discharge machine 300 illustrated in FIG. 4, for example, the temperature of the upper part of the column 303, the water temperature of the machining fluid in the machining tank 302, and the room temperature around the machine are measured. Then, the thermal displacement amounts of the upper guide 315 and the lower guide 317 are estimated based on the measured temperatures, and the position of the upper guide 315 and the position of the lower guide 317 are compensated.

As a method for estimating the thermal displacement amount, a method using machine learning has been known (for example, JP 2018-069408 A, etc.). In the case of estimating the thermal displacement amount using machine learning, for example, there is a method of creating a thermal displacement compensation model and learning parameters of the model by machine learning. In the above example of the wire electric discharge machine, for example, the following Equation (1) can be used as a thermal displacement compensation model. In Equation (1), $D_u$ and $D_l$ are displacement amounts of the upper guide and the lower guide, respectively, $C_u$, $C_w$, and $C_l$ are the temperature of the upper part of the column 303, the water temperature of the machining fluid in the machining tank 302, and the room temperature around the machine, respectively, and $a1_u$ to $a3_u$ and $a1_l$ to $a3_l$ are coefficients determined by a type of wire electric discharge machine and an operating environment.

$$D_u = a1_u \times C_u + a2_u \times C_w + a3_u \times C_l$$

$$D_l = a1_l \times C_u + a2_l \times C_w + a3_l \times C_l \qquad (1)$$

In machine learning, the temperature and the thermal displacement amount of each part are measured while changing the temperature of the room or operating the wire electric discharge machine. Then, the coefficients are determined so that a difference between the measured displacement amount and the displacement amount calculated when the measured temperature is applied to Equation (1) is minimized (for example, by the method of least squares). By using Equation (1) in which the coefficients are determined, the compensation amount when a predetermined temperature is measured can be estimated, and thus the upper guide position and the lower guide position can be compensated based on the estimated compensation amount.

In the case of performing thermal displacement compensation of the electric discharge machine using machine learning technology, it is necessary to create a thermal displacement compensation model that can be adapted to various environmental conditions, measure data that takes into account various environmental conditions, and then perform learning using the data as teacher data. However, there are various conditions that determine the environment of the electric discharge machine, and it takes a lot of labor to perform machine learning to be able to adapt to all environments.

For example, in machining by the electric discharge machine, in the case of cutting a workpiece, rough machining is performed in which power applied to the electric discharge is strongly set. In this case, since heat generated by a machining fluid pump or the electric discharge becomes large, the water temperature of the machining fluid significantly rises. In addition, in the case of performing machining to smooth a cut surface of the cut workpiece, finishing machining is performed in which power applied to the electric discharge is set to be suppressed. In this case, heat generated by the machining fluid pump or the electric discharge is smaller than that in rough machining, and a rise in the water temperature of the machining fluid becomes smaller. In addition, during non-machining in which machining is not performed, there is almost no rise in the water temperature due to machining.

On the other hand, the water temperature of the machining fluid supplied to the machining tank 302 of the wire electric discharge machine 300 is managed by a machining fluid cooling device (not illustrated). This machining fluid cooling device manages the water temperature of the machining fluid so that the water temperature becomes the same value as the room temperature around the machine.

Figure 5:
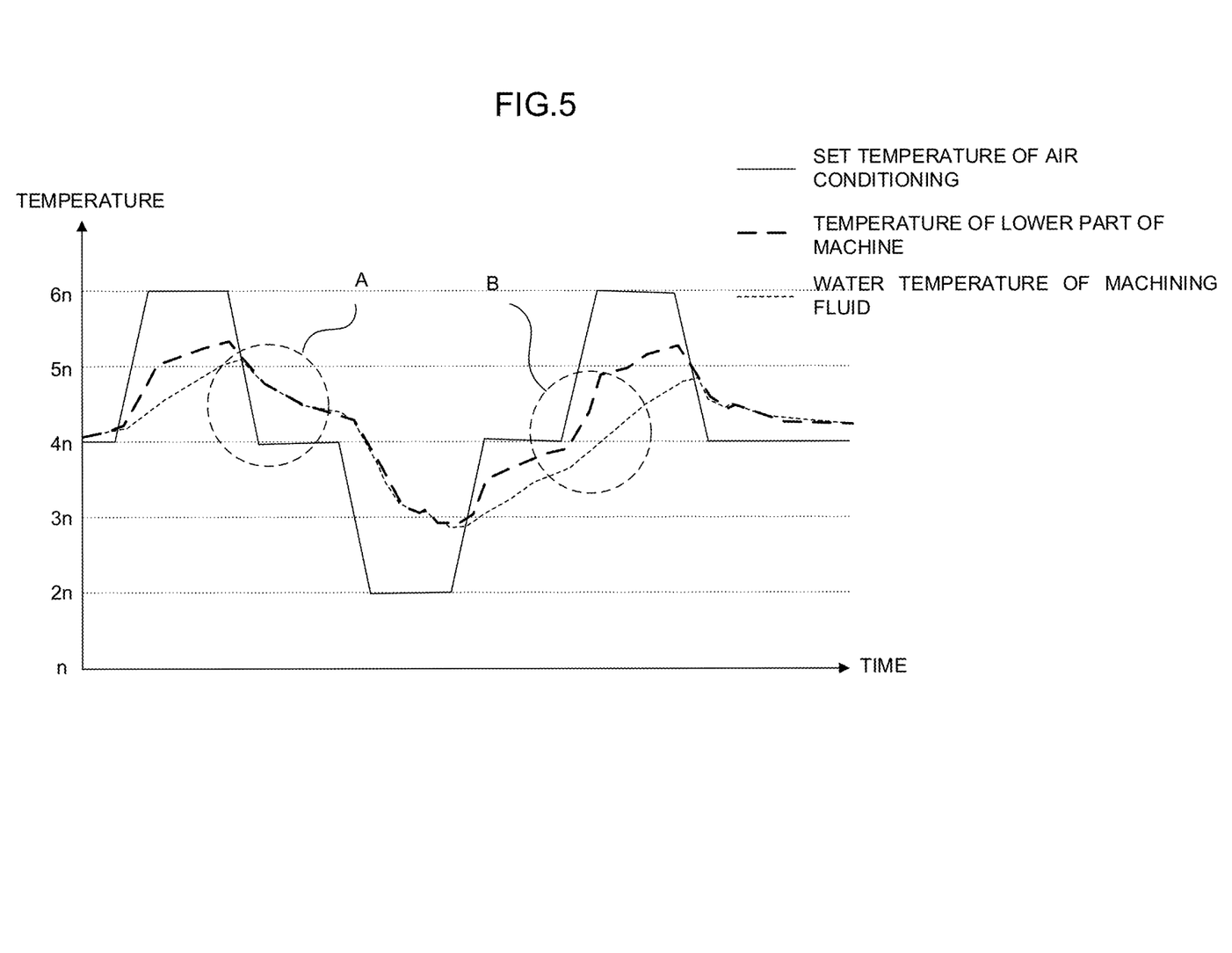
FIG. 5 is a graph showing changes in a room temperature around the machine and a water temperature of a machining fluid when setting of air conditioning in a room is changed.

FIG. 5 shows, as a graph, changes in the room temperature around the machine and the water temperature of the machining fluid when setting of air conditioning in the room is changed. As shown in FIG. 5, when the room temperature drops (A in the figure), the water temperature of the machining fluid is cooled by the machining fluid cooling device so as to follow the room temperature around the machine. However, when the room temperature rises (B in the figure), since the machining fluid cooling device does not have a function of heating the machining fluid, the water temperature of the machining fluid cannot follow the room temperature around the machine. That is, in order to make the water temperature of the machining fluid follow the room temperature around the machine when the room temperature rises, it is necessary to heat the machining fluid by an effect other than the machining fluid cooling device.

Due to a characteristic of water temperature management by this machining fluid cooling device, the environment of the electric discharge machine may be different between the case of performing rough machining in which a large amount of heat is generated and the case of performing finishing machining in which a small amount of heat is generated or the case of not performing machining. That is, in the case of performing rough machining, the machining fluid is heated by heat generation, so that the water temperature of the machining fluid can be followed when the room temperature around the machine rises. However, in the case of performing finishing machining or in the case of not performing machining, heat generation is small and the machining fluid is insufficiently heated, so that it becomes difficult for the water temperature of the machining fluid to follow the room temperature around the machine.

For this reason, when performing machine learning, it is necessary to measure the temperature and the thermal displacement amount of each part in each of the case of performing rough machining and the case of performing finishing machining or the case of performing no machining, create teacher data thereof, and use the created teacher data for learning since it is not possible to create a model that accurately estimates the thermal displacement amount in one environment using only teacher data obtained by measurement in the other environment. However, such a data measurement operation imposes a great burden on an operator.

SUMMARY OF THE INVENTION

Therefore, there is a demand for a technology that makes it possible to reduce the labor required for a learning operation when performing thermal displacement compensation in the electric discharge machine using the above-mentioned machine learning technology.

The thermal displacement compensator of the application solves the above-mentioned problem using a temperature difference between predetermined portions as data for learning and estimating the thermal displacement compensation amount. For example, a term obtained by multiplying a coefficient by a difference between the room temperature around the machine and the temperature following the room temperature (water temperature in the above example) is further provided to an equation of the thermal displacement compensation model illustrated in Equation (1).

A thermal displacement compensator according to an aspect of the application has a function related to thermal displacement compensation for compensating thermal displacement of a machine configured by a combination of a plurality of mechanical elements, and includes a temperature acquisition unit for measuring a temperature of an environment in which the machine is installed and a temperature of each part of the machine, a thermal displacement amount acquisition unit for acquiring a thermal displacement amount of the machine, a temperature difference calculation unit for calculating a temperature difference between at least two temperatures among temperatures measured by the temperature acquisition unit, and a learning unit for creating a thermal displacement compensation model for estimating output data from input data by machine learning based on teacher data using a temperature measured by the temperature acquisition unit and a temperature difference calculated by the temperature difference calculation unit as the input data and using a thermal displacement amount acquired by the thermal displacement amount acquisition unit as the output data.

A thermal displacement compensator according to another aspect of the application has a thermal displacement compensation function for compensating thermal displacement of a machine configured by a combination of a plurality of mechanical elements, and includes a temperature acquisition unit for measuring a temperature of an environment in which the machine is installed and a temperature of each part of the machine, a thermal displacement amount acquisition unit for acquiring a thermal displacement amount of the machine, a temperature difference calculation unit for calculating a temperature difference between at least two temperatures among temperatures measured by the temperature acquisition unit, a learning model storage unit for storing a thermal displacement compensation model created by performing machine learning based on teacher data using a temperature of an environment in which the machine is installed, temperatures of respective parts of the machine, a temperature difference calculated from at least two temperatures among the temperature of the environment and the temperatures of the respective parts of the machine as input data and using a thermal displacement amount of the machine as output data, an estimation unit for estimating a thermal displacement amount of the machine using the thermal displacement compensation model stored in the learning model storage unit based on a temperature measured by the temperature acquisition unit and a temperature difference calculated by the temperature difference calculation unit, and a compensation unit for compensating thermal displacement of the machine based on an estimation result of the estimation unit.

The machine may be a wire electric discharge machine, and the temperature difference calculated by the temperature difference calculation unit may be a difference between a temperature of a machining fluid in a machining tank of the wire electric discharge machine and another temperature. In addition, the other temperature may be a temperature at a spot referred to when the temperature of the machining fluid is adjusted.

The present invention having the aforementioned configuration can reduce the labor required for a learning operation when performing thermal displacement compensation in an electric discharge machine using a machine learning technology by having the above-described configurations.

DETAILED DESCRIPTION OF THE PREFERRED EMBODIMENTS

Figure 1:
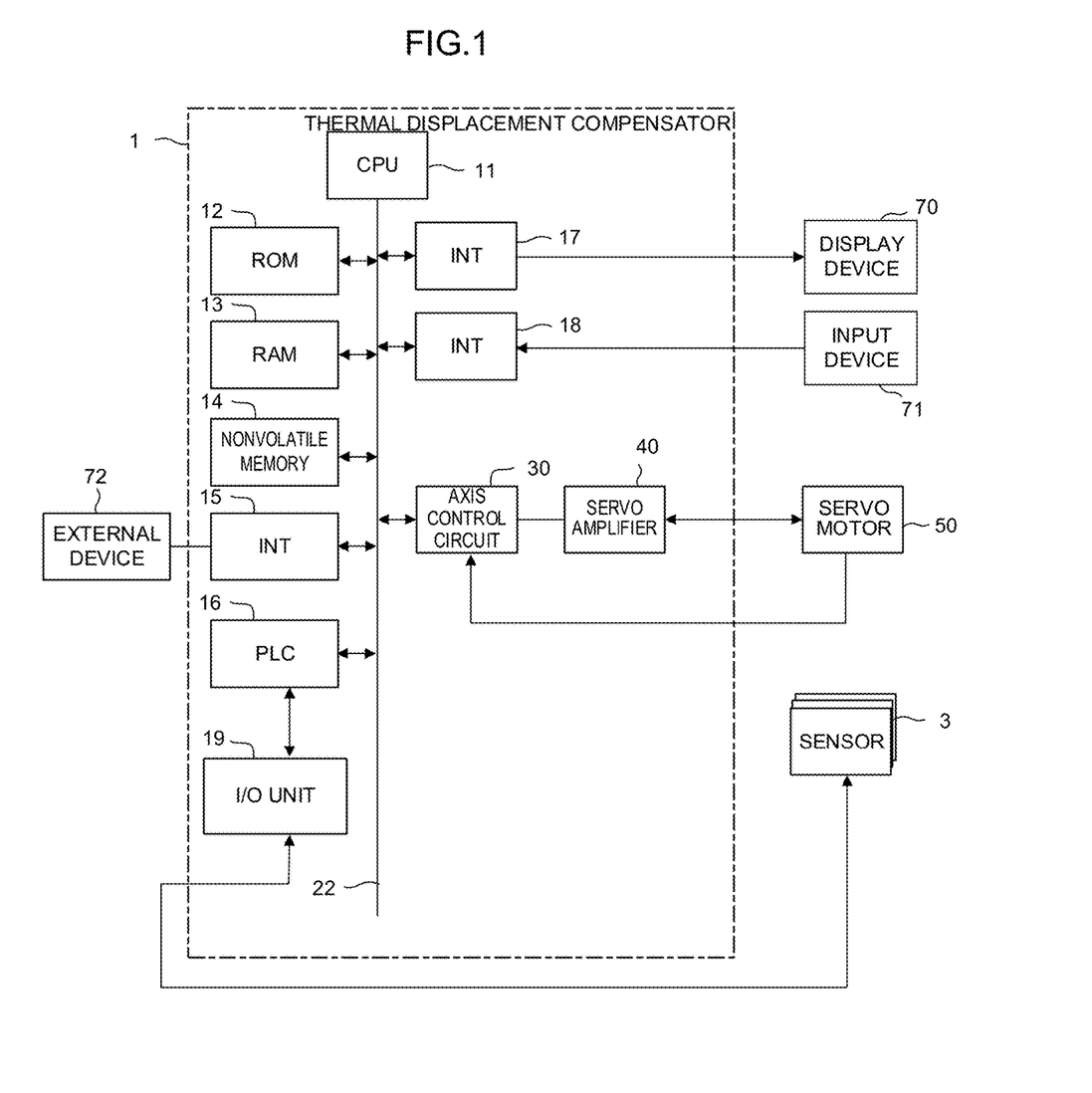
FIG. 1 is a schematic hardware configuration diagram of a thermal displacement compensator according to an embodiment.

FIG. 1 is a schematic hardware configuration diagram illustrating a main part of a thermal displacement compensator according to an embodiment of the application.

For example, a thermal displacement compensator 1 of the application can be mounted as a controller that controls an industrial machine such as an electric discharge machine based on a control program, or mounted on a personal computer attached to a controller that controls an industrial machine based on a control program or a personal computer, a cell computer, a fog computer, or a cloud server connected to the controller via a wired/wireless network. In the present embodiment, the thermal displacement compensator 1 is mounted as a controller that controls a wire electric discharge machine based on a control program.

A CPU 11 included in the thermal displacement compensator 1 according to the present embodiment is a processor that controls the thermal displacement compensator 1 as a whole. The CPU 11 reads a system program stored in a ROM 12 via a bus 22 and controls the entire thermal displacement compensator 1 according to the system program. Temporary calculation data, display data, various data input from the outside, etc. are temporarily stored in a RAM 13.

For example, a nonvolatile memory 14 includes a memory backed up by a battery (not illustrated), a solid state drive (SSD), etc., and retains a storage state even when power of the thermal displacement compensator 1 is turned OFF. The nonvolatile memory 14 stores a control program or data read from an external device 72 via an interface 15, a control program or data input via an input device 71, a control program or data acquired from another device via a network (not illustrated), etc. The control program or data stored in the nonvolatile memory 14 may be loaded in the RAM 13 during execution/use. In addition, various system programs such as a known analysis program are written in advance in the ROM 12.

The interface 15 is an interface for connecting the CPU 11 of the thermal displacement compensator 1 and the external device 72 such as a USB device to each other. For example, a control program, setting data, etc. used for controlling the wire electric discharge machine is read from the external device 72 side. Further, a control program, setting data, etc. edited in the thermal displacement compensator 1 can be stored in external storage means via the external device 72. A programmable logic controller (PLC) 16 executes a ladder program to output a signal to the wire electric discharge machine and a peripheral device of the wire electric discharge machine (for example, a sensor 3 such as a temperature sensor attached to measure a temperature of an environment of the wire electric discharge machine and a temperature of each part) via an I/O unit 19 and performs a control operation. In addition, signals from various switches, a peripheral device, etc. on a console panel installed in a main body of the wire electric discharge machine are received, signal processing necessary for the received signals is performed, and then the signals are transferred to the CPU 11.

Each piece of data read on a memory, data obtained as a result of executing a program, etc. are output via an interface 17 and displayed on a display device 70. In addition, the input device 71 which includes a keyboard, a pointing device, etc. transfers a command, data, etc. based on an operation by the operator to the CPU 11 via an interface 18.

An axis control circuit 30 for controlling an axis included in the wire electric discharge machine receives an axis movement command amount from the CPU 11 and outputs an axis command to a servo amplifier 40. In response to this command, the servo amplifier 40 drives a servomotor 50 that moves an axis included in a machine tool. The servomotor 50 for the axis includes a position/speed detector, feeds back a position/speed feedback signal from the position/speed detector to the axis control circuit 30, and performs position/speed feedback control. Note that even though only one axis control circuit 30, one servo amplifier 40, and one servomotor 50 are illustrated in the hardware configuration diagram of FIG. 1, axis control circuits 30, servo amplifiers 40, and servomotors 50 are actually prepared as many as the number of axes (for example, five axes of X, Y, Z, U, and V) included in the wire electric discharge machine to be controlled.

Figure 2:
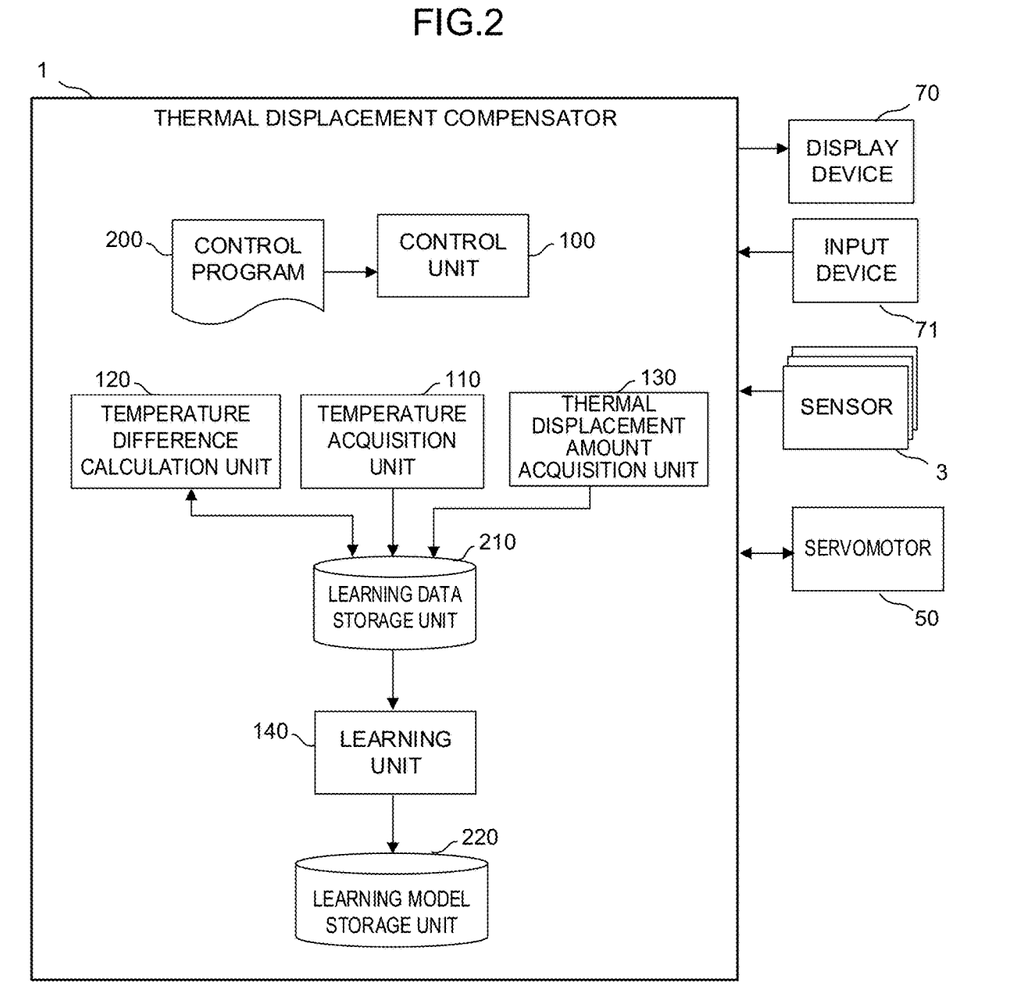
FIG. 2 is a schematic block diagram illustrating a function of a thermal displacement compensator according to a first embodiment.

FIG. 2 illustrates, as a schematic block diagram, functions of a thermal displacement compensator 1 according to a first embodiment of the application.

Each function provided in the thermal displacement compensator 1 according to the present embodiment is implemented by the CPU 11 included in the thermal displacement compensator 1 illustrated in FIG. 1 executing a system program and controlling the operation of each part of the thermal displacement compensator 1.

The thermal displacement compensator 1 of the present embodiment includes a control unit 100, a temperature acquisition unit 110, a temperature difference calculation unit 120, a thermal displacement amount acquisition unit 130, and a learning unit 140. In addition, a control program 200 for controlling the wire electric discharge machine is stored in advance in the RAM 13 or the nonvolatile memory 14 of the thermal displacement compensator 1, and each of a learning data storage unit 210 as an area for storing learning data that uses learning by the learning unit 140 and a learning model storage unit 220 as an area for storing a learning model created by the learning unit 140 is provided.

The control unit 100 is implemented by the CPU 11 included in the thermal displacement compensator 1 illustrated in FIG. 1 executing a system program read from the ROM 12 so that arithmetic processing using the RAM 13 and the nonvolatile memory 14 by the CPU 11, control processing on each part of the wire electric discharge machine using the axis control circuit 30 and the PLC 16, and input/output processing via the interface 18 are mainly performed. The control unit 100 analyzes a block of the control program 200, and controls the wire electric discharge machine and a peripheral device thereof based on an analysis result. For example, when the block of the control program 200 commands that each axis of the wire electric discharge machine be driven, the control unit 100 generates movement command data according to the command from the block and outputs the generated movement command data to the servomotor 50. For example, when the block of the control program 200 gives a command to apply a voltage to the wire electrode or a command to circulate the machining fluid, the control unit 100 outputs command data to an electric discharge power supply or a pump according to the command by the block. In addition, for example, when the block of the control program 200 gives a command to operate a peripheral device such as the sensor 3 attached to the wire electric discharge machine, the control unit 100 generates a predetermined signal for operating the peripheral device and outputs the generated signal to the PLC 16. Meanwhile, the control unit 100 acquires speed feedback of the servomotor 50 and temperature data measured by the sensor 3 such as the temperature sensor.

The temperature acquisition unit 110 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 and control processing using the PLC 16 are mainly performed. The temperature acquisition unit 110 acquires temperature data of a temperature of the environment of the wire electric discharge machine and the temperature of each part measured by the sensor 3. The temperature data acquired by the temperature acquisition unit 110 includes, for example, measurements of the room temperature around the machine, the temperature of the upper part of the column 303, and the water temperature of the machining fluid in the machining tank 302. The temperature data acquired by the temperature acquisition unit 110 is stored in the learning data storage unit 210 in association with a measurement time.

The temperature difference calculation unit 120 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 is mainly performed. The temperature difference calculation unit 120 calculates a difference between pieces of predetermined temperature data set in advance in temperature data acquired by the temperature acquisition unit 110. For example, the temperature difference calculation unit 120 calculates a difference between temperature data of the water temperature of the machining fluid and temperature data of the room temperature around the machine, and stores the calculated difference in temperature data in the learning data storage unit 210 in association with temperature data of a calculation source. It is desirable that the temperature data for which the temperature difference calculation unit 120 calculates the difference is a difference between temperature data of a temperature measured at a predetermined part of the wire electric discharge machine and temperature data of a temperature at a spot referred to when the temperature is adjusted. In the case of the wire electric discharge machine, as described above, the water temperature of the machining fluid is adjusted to follow the room temperature around the machine by the machining fluid cooling device. For this reason, in the case of performing thermal displacement compensation by machine learning in the wire electric discharge machine having such a configuration, it is sufficient that the temperature difference calculation unit 120 calculates the difference between the temperature data of the water temperature of the machining fluid and the temperature data of the room temperature around the machine. When the temperature is adjusted in a plurality of parts of the wire electric discharge machine, the temperature difference calculation unit 120 may calculate the difference in temperature data of the plurality of parts.

The thermal displacement amount acquisition unit 130 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 and control processing using the PLC 16, the interface 18, etc. are mainly performed. The thermal displacement amount acquisition unit 130 acquires the thermal displacement amount of the wire electric discharge machine measured at a predetermined timing. The thermal displacement amount acquisition unit 130 may acquire the thermal displacement amount using a sensor for measuring a distance between the upper guide 315 and the lower guide 317 (parts where the thermal displacement occurs) and the machining tank 302 (parts where the thermal displacement doses not occurs). A relationship between the thermal displacement amount and the time can be easily obtained by referring to a time when each block of the control program 200 is executed. The thermal displacement amount acquired by the thermal displacement amount acquisition unit 130 is stored in the learning data storage unit 210 in association with the time.

The learning unit 140 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 is mainly performed. The learning unit 140 performs processing of machine learning based on teacher data using the temperature data acquired by the temperature acquisition unit 110 and the temperature difference calculated by the temperature difference calculation unit 120 as input data and the thermal displacement amount acquired by the thermal displacement amount acquisition unit 130 as output data. Then, the learning unit 140 creates a thermal displacement compensation model (learning model) for estimating the thermal displacement amount of the wire electric discharge machine from the environment of the wire electric discharge machine, the temperature data acquired from each part, and the temperature difference calculated from the temperature data. As the thermal displacement compensation model created by the learning unit 140, for example, it is possible to use the following Equation (2). In Equation (2), $D_u$ and $D_l$ are displacement amounts of the upper guide and the lower guide, respectively, $C_u$, $C_w$, and $C_l$ are the temperature of the upper part of the column 303, the water temperature of the machining fluid in the machining tank 302, and the room temperature around the machine, respectively, and $a1_u$ to $a4_u$ and $a1_l$ to $a4_l$ are coefficients determined by a type of wire electric discharge machine and an operating environment.

$$D_u = a1_u \times C_u + a2_u \times C_w + a3_u \times C_l + a4_u \times (C_w - C_l)$$

$$D_l = a1_l \times C_u + a2_l \times C_w + a3_l \times C_l + a4_l \times (C_w - C_l) \qquad (2)$$

Figure 6:
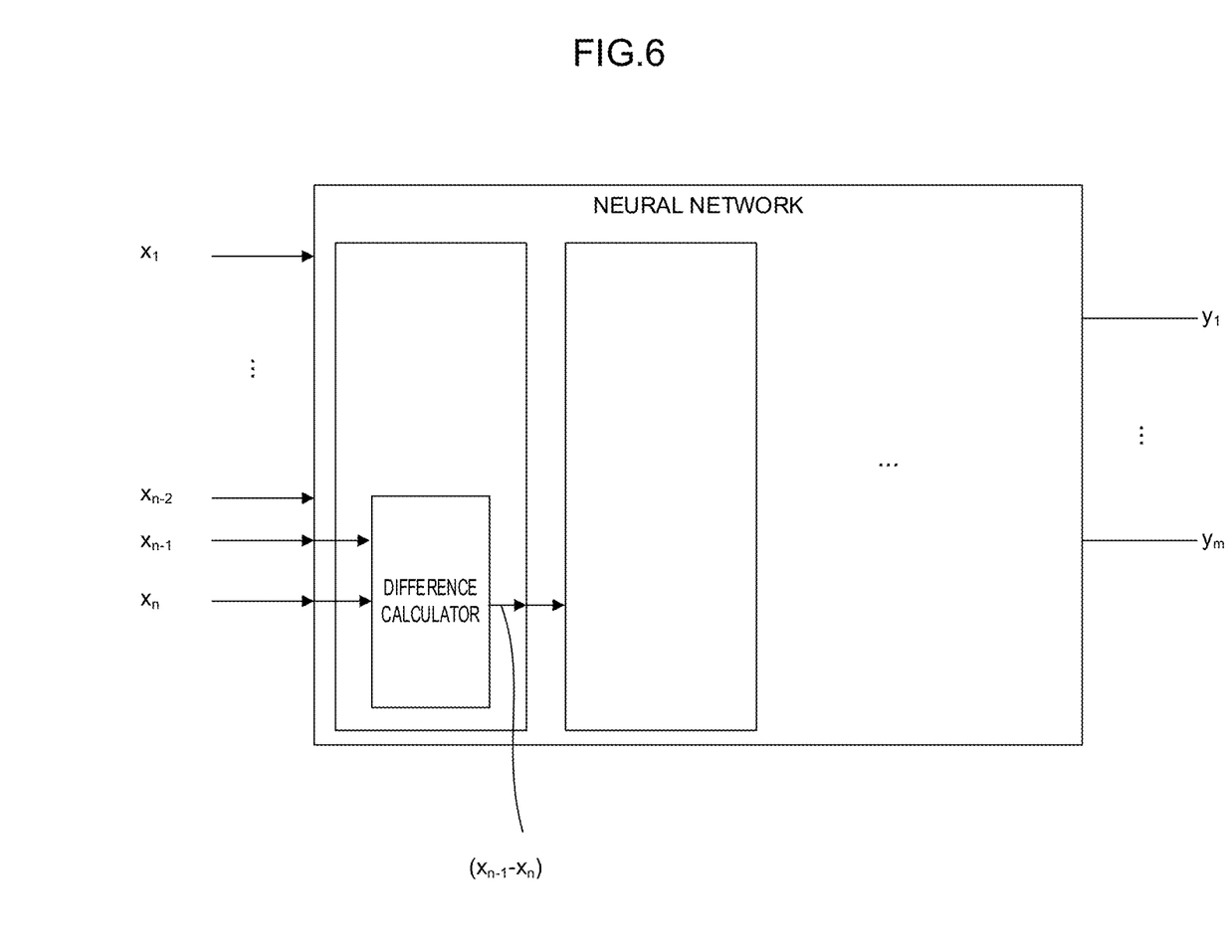
FIG. 6 is a diagram illustrating an example of constructing a learning model using a neural network.

In addition, as the thermal displacement compensation model created by the learning unit 140, for example, it is possible to use a neural network having a multi-layer structure, etc. Even in this case, the same effect can be expected by using a temperature difference between predetermined temperatures in addition to the temperature of each part as input data. In this instance, for example, as illustrated in FIG. 6, it is possible to construct a difference calculator that adjusts a parameter of a node arranged at a position close to an input layer to calculate a difference between input predetermined temperatures. In this way, the same effect can be expected by performing learning of a neural network including a node other than the node that functions as the difference calculator. The learning model created by the learning unit 140 is stored in the learning model storage unit 220.

The thermal displacement compensator 1 according to the present embodiment having the above configuration can generate a learning model learning a correlation between the temperature data of the temperature of the environment of the wire electric discharge machine or each part of the wire electric discharge machine and the difference in the previously selected temperature data and the thermal displacement amount of the wire electric discharge machine. The learning model generated here can be used to estimate the thermal displacement amount of the wire electric discharge machine from the temperature data of the temperature of the environment of the wire electric discharge machine or each part of the wire electric discharge machine and the difference in the previously selected temperature data.

When machine learning is performed using the thermal displacement compensator 1 according to the present embodiment, it is possible to create a learning model that can accurately estimate the thermal displacement amount in various temperature patterns by acquiring data including variations of the difference in the predetermined temperature data. For this reason, it is unnecessary to measure a temperature state in both the case of performing rough machining and the case of performing finishing machining or the case of performing no machining, and it is possible to create a learning model that can accurately estimate the thermal displacement amount only by acquiring data in any one of the cases. In this way, it is expected that the labor of the operator during machine learning can be reduced.

Figure 3:
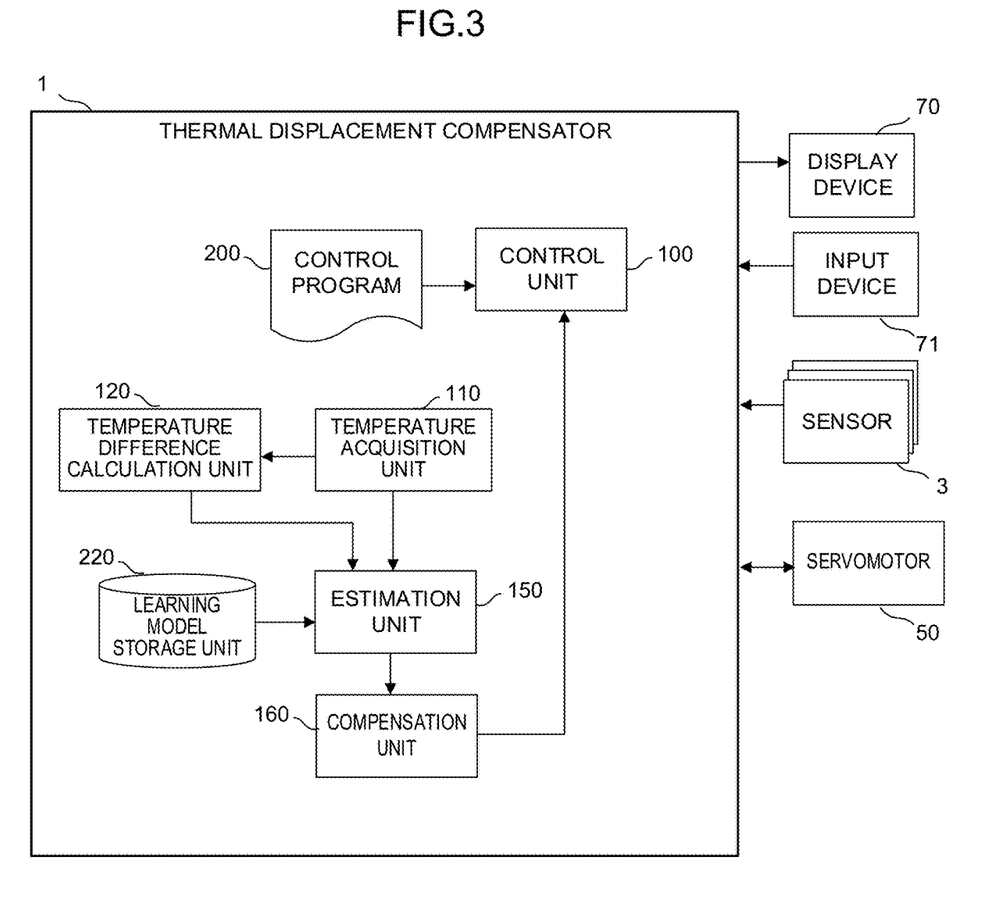
FIG. 3 is a schematic block diagram illustrating a function of a thermal displacement compensator according to a second embodiment.

FIG. 3 illustrates, as a schematic block diagram, functions of a thermal displacement compensator 1 according to a second embodiment of the application.

Each function provided in the thermal displacement compensator 1 according to the present embodiment is implemented by the CPU 11 included in the thermal displacement compensator 1 illustrated in FIG. 1 executing a system program and controlling the operation of each part of the thermal displacement compensator 1.

The thermal displacement compensator 1 of the present embodiment includes a control unit 100, a temperature acquisition unit 110, a temperature difference calculation unit 120, an estimation unit 150, and a compensation unit 160. In addition, a control program 200 for controlling the wire electric discharge machine is stored in advance in the RAM 13 or the nonvolatile memory 14 of the thermal displacement compensator 1, and a learning model storage unit 220 storing a learning model created by the learning unit 140 according to the first embodiment is provided.

The control unit 100 according to the present embodiment has the same functions as those of the control unit 100 according to the first embodiment described above.

Similarly to the temperature acquisition unit 110 according to the first embodiment, the temperature acquisition unit 110 according to the present embodiment acquires temperature data of the temperature of the environment of the wire electric discharge machine and the temperature of each part measured by the sensor 3. The temperature data acquired by the temperature acquisition unit 110 according to the present embodiment is output to the temperature difference calculation unit 120 and the estimation unit 150.

Similarly to the temperature difference calculation unit 120 according to the first embodiment, the temperature difference calculation unit 120 according to the present embodiment calculates a difference between pieces of predetermined temperature data set in advance in the temperature data acquired by the temperature acquisition unit 110. The difference in the temperature data calculated by the temperature difference calculation unit 120 according to the present embodiment is output to the estimation unit 150 in association with temperature data of a calculation source.

The estimation unit 150 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 is mainly performed. The estimation unit 150 performs estimation processing of machine learning using the learning model stored in the learning model storage unit 220 based on the temperature data acquired by the temperature acquisition unit 110 and the temperature difference calculated by the temperature difference calculation unit 120. Then, the estimation unit 150 calculates the thermal displacement amount of the wire electric discharge machine based on the temperature data acquired by the temperature acquisition unit 110 and the temperature difference calculated by the temperature difference calculation unit 120. For example, when the learning model is an equation exemplified by the above Equation (2), the estimation unit 150 calculates the thermal displacement amounts of the upper guide and the lower guide by substituting the temperature data acquired by the temperature acquisition unit 110 and the temperature difference calculated by the temperature difference calculation unit 120 for each variable. For example, when the learning model is a neural network, etc., the estimation unit 150 inputs the temperature data acquired by the temperature acquisition unit 110 and the temperature difference calculated by the temperature difference calculation unit 120 to the neural network, and obtains the thermal displacement amounts of the upper guide and the lower guide as output values. Then, the thermal displacement compensation amount to be compensated is estimated from the obtained thermal displacement amount. The thermal displacement compensation amount estimated by the estimation unit 150 is output to the compensation unit 160.

The compensation unit 160 is implemented by the CPU 11 included in the thermal displacement compensator 1 illustrated in FIG. 1 executing each system program read from the ROM 12 so that arithmetic processing using the RAM 13 and the nonvolatile memory 14 by the CPU 11 is mainly performed. The compensation unit 160 commands the control unit 100 to compensate the position of each axis of the wire electric discharge machine based on the thermal displacement compensation amount of the wire electric discharge machine estimated by the estimation unit 150.

The thermal displacement compensator 1 according to the present embodiment having the above configuration estimates the thermal displacement compensation amount using the learning model based on the temperature data of the temperature of the environment of the wire electric discharge machine or each part of the wire electric discharge machine and the difference in the previously selected temperature data. Then, the position of each axis of the wire electric discharge machine can be compensated based on the estimated thermal displacement compensation amount.

One embodiment of the application has been described above. However, the application is not limited to only the examples of the embodiments described above, and can be implemented in various modes by making appropriate changes.

In the above embodiment, the thermal displacement compensation amount of the wire electric discharge machine is estimated. However, the thermal displacement compensator according to the application can be widely used for the electric discharge machine and other industrial machines requiring thermal displacement compensation. In particular, temperature data of a temperature measured in a predetermined part of an industrial machine can be suitably used in an industrial machine having a configuration adjusted with reference to an ambient temperature or a temperature measured in another predetermined part.

The invention claimed is:

1. A thermal displacement compensator having a function related to thermal displacement compensation for compensating thermal displacement of a machine configured by a combination of a plurality of mechanical elements, the thermal displacement compensator comprising a processor:

the processor is configured to
measure a temperature of an environment in which the machine is installed and a temperature of each part of the machine;
acquire a thermal displacement amount of the machine;
calculate a temperature difference between at least two temperatures among the measured temperatures; and
create a thermal displacement compensation model for estimating output data from input data by performing machine learning based on teacher data using the measured temperature and the calculated temperature difference as the input data and using the acquired thermal displacement amount as the output data.

2. The thermal displacement compensator according to claim 1, wherein the machine is a wire electric discharge machine, and the calculated temperature difference is a difference between a temperature of a machining fluid in a machining tank of the wire electric discharge machine and another temperature.

3. The thermal displacement compensator according to claim 2, wherein the other temperature is the temperature of the environment in which the wire electric discharge machine or the temperature of each part of the wire electric discharge machine referred to when temperature of the machining fluid is adjusted.

4. A thermal displacement compensator having a thermal displacement compensation function for compensating thermal displacement of a machine configured by a combination of a plurality of mechanical elements, the thermal displacement compensator comprising a processor:

the processor is configured to
measure a temperature of an environment in which the machine is installed and a temperature of each part of the machine;
acquire a thermal displacement amount of the machine;
calculate a temperature difference between at least two temperatures among the measured temperatures;
store a thermal displacement compensation model created by performing machine learning based on teacher data using the measured temperature of an environment in which the machine is installed, temperatures of respective parts of the machine, the temperature difference calculated from at least two temperatures among the temperature of the environment and the temperatures of the respective parts of the machine as input data and using the thermal displacement amount of the machine as output data;
estimate a thermal displacement amount of the machine using the stored thermal displacement compensation model based on a measured temperature and a calculated temperature difference; and
compensate thermal displacement of the machine based on an estimation result.

* * * * *